(12) United States Patent
Muchherla et al.

(10) Patent No.: US 10,915,400 B1
(45) Date of Patent: Feb. 9, 2021

(54) DYNAMIC OVER PROVISIONING ALLOCATION FOR PURPOSED BLOCKS

(71) Applicant: Micron Technology, Inc., Boise, ID (US)

(72) Inventors: Kishore Kumar Muchherla, Fremont, CA (US); Harish R. Singidi, Fremont, CA (US); Ashutosh Malshe, Fremont, CA (US); Vamsi Pavan Rayaprolu, San Jose, CA (US); Sampath K. Ratnam, Boise, ID (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 16/679,019

(22) Filed: Nov. 8, 2019

(51) Int. Cl.
| | |
|---|---|
| *G06F 11/00* | (2006.01) |
| *G06F 11/10* | (2006.01) |
| *G06F 11/07* | (2006.01) |
| *G06F 9/50* | (2006.01) |
| *G06F 12/02* | (2006.01) |
| *G06F 11/30* | (2006.01) |

(52) U.S. Cl.
CPC ........ *G06F 11/1076* (2013.01); *G06F 9/5016* (2013.01); *G06F 11/076* (2013.01); *G06F 11/3037* (2013.01); *G06F 12/0246* (2013.01)

(58) Field of Classification Search
CPC .............. G06F 11/1076; G06F 11/076; G06F 11/3037; G06F 12/0246; G06F 9/5016
USPC .................. 714/764, 763, 766, 800, 799
See application file for complete search history.

(56) References Cited

U.S. PATENT DOCUMENTS

| | | | |
|---|---|---|---|
| 2018/0188984 A1* | 7/2018 | Tai ................... | G06F 12/0246 |
| 2019/0163592 A1* | 5/2019 | Camp ................ | G06F 3/0655 |
| 2020/0117590 A1* | 4/2020 | Brandt .............. | G06F 12/1009 |
| 2020/0278896 A1* | 9/2020 | Kumari .............. | G11C 29/42 |

* cited by examiner

*Primary Examiner* — Christine T. Tu
(74) *Attorney, Agent, or Firm* — Lowenstein Sandler LLP

(57) ABSTRACT

One or more blocks from a pool of storage area blocks of the memory component are allocated to a first set of purposed blocks. First write operations are performed to write first data to first data stripes at user blocks of the memory component. Whether the blocks in the first set of purposed blocks satisfy a condition indicating that the first set of purposed blocks are to be retired is determined. Responsive to the blocks in the first set of purposed blocks satisfying the condition, one or more other blocks from the pool of storage area blocks of the memory component are allocated to a second set of purposed blocks. Second write operations are performed to write second data to second data stripes at the user blocks of the memory component.

20 Claims, 9 Drawing Sheets

DYNAMIC OVER PROVISIONING ALLOCATION FOR PURPOSED BLOCKS

TECHNICAL FIELD

Embodiments of the disclosure relate generally to memory sub-systems, and more specifically, relate to the dynamic allocation of one or more blocks from a pool of storage area blocks of a memory component for use as purposed blocks.

BACKGROUND

A memory sub-system can include one or more memory components that store data. The memory components can be, for example, non-volatile memory components and volatile memory components. In general, a host system can utilize a memory sub-system to store data at the memory components and to retrieve data from the memory components.

BRIEF DESCRIPTION OF THE DRAWINGS

The disclosure will be understood more fully from the detailed description given below and from the accompanying drawings of various embodiments of the disclosure.

DETAILED DESCRIPTION

Figure 1A:
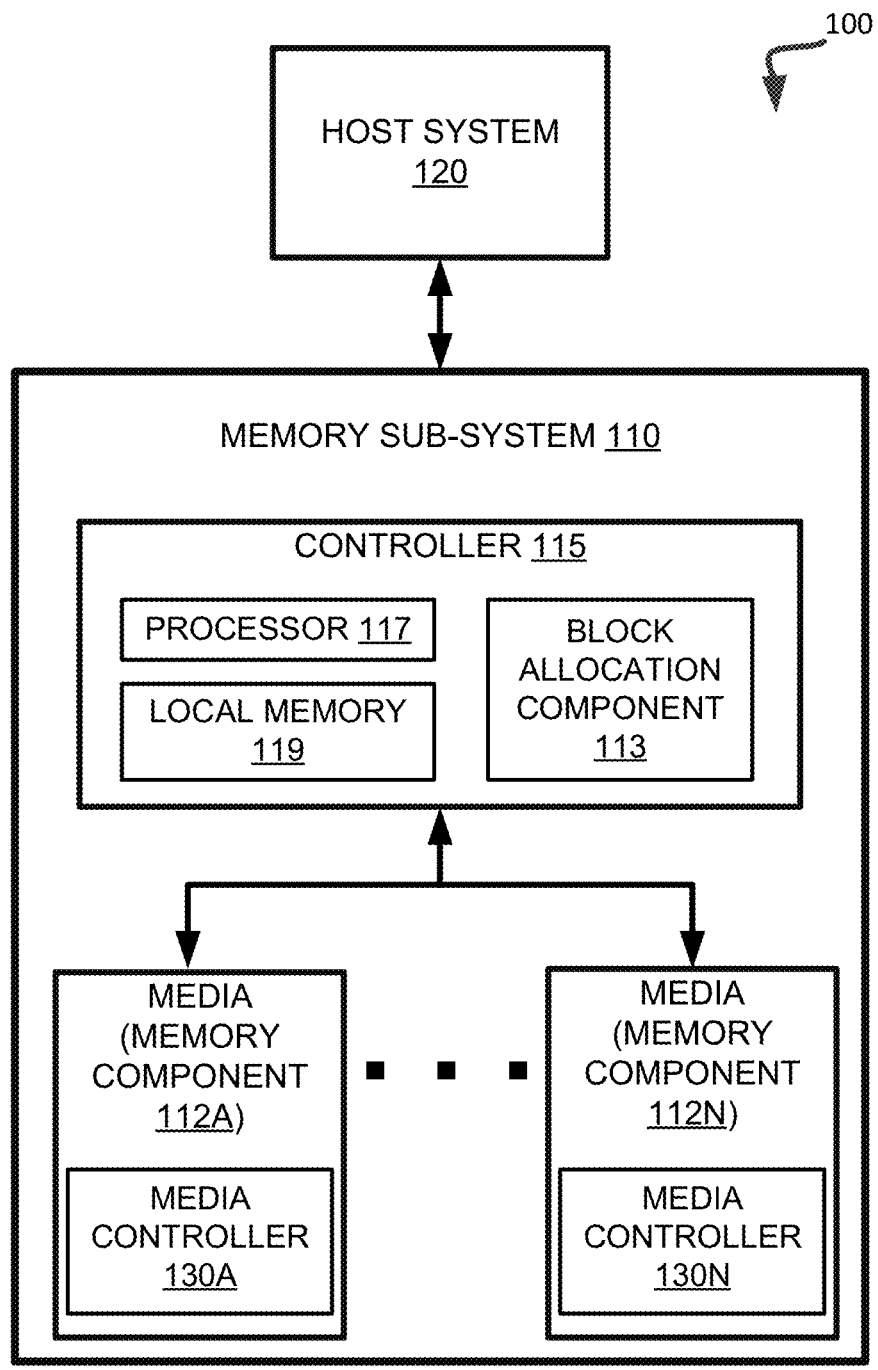
FIG. 1A illustrates an example computing environment that includes a memory sub-system, in accordance with some embodiments of the disclosure.

Aspects of the present disclosure are directed to the dynamic allocation of one or more blocks from a pool of storage area blocks of a memory component for use as purposed blocks. A memory sub-system can be a storage device, a memory module, or a hybrid of a storage device and memory module. Examples of storage devices and memory modules are described below in conjunction with FIG. 1. In general, a host system can utilize a memory sub-system that includes one or more memory devices that store data. The host system can provide data to be stored at the memory sub-system and can request data to be retrieved from the memory sub-system.

A memory device can be a non-volatile memory device. A non-volatile memory device is a package of one or more dice. Each die can consist of one or more planes. For some types of non-volatile memory devices (e.g., negative-and (NAND) devices), each plane consists of a set of physical blocks. Each block consists of a set of pages. Each page consists of a set of memory cells, which store bits of data. For some memory devices, such as NAND devices, blocks are the smallest area than can be erased and pages within the blocks cannot be erased individually. For such devices, erase operations are performed one block at a time. A page of a block can contain valid data, invalid data, or no data. Invalid data is data that is marked as outdated as a new version of the data is stored on the memory device. Valid data is the most recent version of such data being stored on the memory device. A memory sub-system can mark data as invalid based on information received, for example, from an operating system.

A block may have some pages containing valid data and some pages containing invalid data. To avoid waiting for all of the pages in the block to have invalid data in order to erase and reuse the block, an algorithm hereinafter referred to as "garbage collection" can be invoked to allow the block to be erased and reused for write operations. Garbage collection is a set of operations that include, for example, selecting a block that contains valid and invalid data, selecting pages in the block that contain valid data, copying the valid data to new locations (e.g., free pages in another block), marking the data in the previously selected pages as invalid, and erasing the selected block.

Since garbage collection can write the valid data to a different block before the block is erased, data can be rewritten many times to different blocks at the memory sub-system. The amount of additional rewrites of data in the memory sub-system is referred to herein as write-amplification. Write-amplification can reduce the operating life of a memory sub-system. To reduce write-amplification, the memory sub-system can include some amount of additional blocks in excess to a total number of blocks that are available at any single time to store data from the host system. Such additional blocks can be considered over-provisioning. A larger amount of over-provisioning can significantly reduce write-amplification as the number of times that data is rewritten within the memory sub-system due to garbage collection attempting to free up blocks is reduced.

A "storage area block" can refer to a pool of blocks (e.g., minimum number) that accommodate the rated memory sub-system capacity (e.g., drive capacity) and the over provisioning blocks. For example, if a memory sub-system has 256 Gigabyte (GB) rated capacity, the storage area blocks include a pool of blocks for the full user capacity of 256 GB and over provisioning blocks. It is from the pool of storage area blocks that other blocks are dynamically allocated as parity blocks or other "special" purposed blocks. In some embodiments, the more blocks that are allocated from the storage area blocks as purposed blocks, the fewer blocks are allocated as over provisioning blocks. In an illustrative example, the pool of storage area blocks include 1100 blocks. 1000 blocks are used as user blocks to accommodate the 265 GB data capacity, and 100 blocks are used as over provisioning blocks.

A "purposed block" can refer to a block that is used for a specific purpose. Examples of purposed blocks can include parity blocks, blocks that store temporary data for an application, such as a scratch pad application, or temporary system data. In some embodiments, the number of purposed blocks that are allocated for a specific purpose are not dictated by instantaneous use (e.g., at any given time) but are dictated by the number of blocks used to accommodate X amount of data written to the purposed blocks during the lifetime of the memory sub-system.

Parity blocks can refer to blocks that store parity data. For example, a stripe of user data can be written across multiple nodes. A parity block can store parity data, at least temporarily, for the particular stripe of user data.

In some conventional memory sub-systems, the total number of purposed blocks used over the life of a memory sub-system are allocated as a manufacturing default at time zero. The allocated purposed blocks are used to store purposed data for data stripes written at the memory sub-system. The purposed data is stored at a purposed block(s) for the life of a respective data stripe (e.g., purposed data is stored at a data block for the entire time the respective data stripe is stored at the memory sub-system). For example, if 10 parity blocks are used over the life of the memory sub-system, the 10 parity blocks are allocated at the beginning of operation of the memory sub-system. When data is written at a data stripe, the parity data is created and stored at a parity block(s) until the data of the data stripe is erased using a garbage collection operation. In the aforementioned conventional memory sub-systems, allocating the total number of purposed blocks used over the life of the memory sub-system decreases the amount of OP available to perform garbage collection operations, which increases write amplification and negatively impacts the performance of the memory sub-system.

Aspects of the disclosure address the above challenges, as well as other challenges, by dynamically allocating one or more blocks from a pool of storage area blocks for use as purposed blocks, such as parity blocks. In some embodiments, the number of special purpose blocks required at any given time is less than the total number of special purpose blocks that need to be allocated in the device lifetime. In some embodiments, one or more blocks from a pool of storage area blocks of the memory component are allocated as an initial set of purposed blocks. The purposed blocks are used to store purposed data stored as initial data stripes. Subsequent to writing the initial data (e.g., purposed data) to the initial data stripes, a determination is made as to whether the blocks of the initial set of purposed blocks satisfy a condition indicating that the first set of purposed blocks are to be retired. For example, an indication of the endurance state of the purposed blocks can be evaluated to determine whether the purposed blocks are still reliable or have reached an end-of-life state. Responsive to determining that the blocks are to be retired, one or more other blocks from the pool of storage area blocks are allocated to a subsequent set of purposed blocks, and the initial set of purposed blocks are retired. The subsequent set of purposed blocks can be used to store purposed data for subsequent data stripes.

In some embodiments, the memory sub-system can operate using a "temporary parity scheme." Rather than keeping the parity data for the entire life of the respective data stripe, the parity data can be stored "temporarily" at a parity block. Before the respective data of the data stripe is garbage collected, the parity block can be re-used to store parity data of a subsequent data stripe. For example, bit errors at a particular block often originate from a program operation on the particular block. For instance, a page of a block can be programmed. While the block is open (e.g., the block has not been fully written), another page of the block can be programmed, which can either disturb or corrupt the bits of the previously programmed page of the same block. A temporary parity scheme can store the parity data of a block until the contents of the block are validated. Once the data of the block has been validate, the parity data is not needed and the respective parity block can be re-used to store parity data for another data stripe. For instance, a block can be fully written with data and subsequently closed. After closing the block, the data of the block can be read and compared against the actual data stored in volatile memory. If there are no uncorrectable bit errors at the block, the associated parity data can be "flushed" and the respective parity block can be re-used.

In some embodiments, the pool of storage area blocks (e.g., pool of OP blocks) operate in multi-bit mode (e.g., TLC mode) or single-bit mode, and the purposed blocks operate in a single-bit mode (e.g., SLC mode). When a purposed block(s) is retired, a new parity block(s) is allocated from the pool of storage area blocks (e.g., pool of OP blocks) operating in multi-bit mode or single-bit mode. The new purposed block(s) is then operated in single-bit mode, which has an endurance greater than blocks operating in multi-bit mode. In some embodiments, some block of the pool of storage area blocks can operated in single-bit mode and other blocks of the pool of storage area blocks can operate in multi-bit mode.

Dynamic allocation of purposed blocks, as described herein, can improve memory sub-system performance of a memory sub-system by allowing for more blocks to be allocated for over provisioning for at least a portion of the lifetime of the memory sub-system, which decreases write amplification and improves the performance of the memory sub-system. Additionally, dynamic allocation of purposed blocks can improve a memory sub-system performance by providing additional data blocks to user space for at least a portion of the lifetime of the memory sub-system, which improves the user-space capacity of the memory sub-system.

FIG. 1A illustrates an example computing environment 100 that includes a memory sub-system 110 in accordance with some embodiments of the disclosure. The memory sub-system 110 can include media, such as memory components 112A to 112N also hereinafter referred to as "memory devices"). The memory components 112A to 112N can be volatile memory components, non-volatile memory components, or a combination of such. A memory sub-system 110 can be a storage device, a memory module, or a hybrid of a storage device and memory module. Examples of a storage device include a solid-state drive (SSD), a flash drive, a universal serial bus (USB) flash drive, an embedded Multi-Media Controller (eMMC) drive, a Universal Flash Storage (UFS) drive, and a hard disk drive (HDD). Examples of memory modules include a dual in-line memory module (DIMM), a small outline DIMM (SO-DIMM), and a non-volatile dual in-line memory module (NVDIMM).

The computing environment 100 can include a host system 120 that is coupled to a memory system. The memory system can include one or more memory sub-systems 110. In some embodiments, the host system 120 is coupled to different types of memory sub-system 110. FIG. 1 illustrates one example of a host system 120 coupled to one memory sub-system 110. The host system 120 uses the memory sub-system 110, for example, to write data to the memory sub-system 110 and read data from the memory sub-system 110. As used herein, "coupled to" generally refers to a connection between components, which can be an indirect communicative connection or direct communicative connection (e.g., without intervening components), whether wired or wireless, including connections such as electrical, optical, magnetic, etc.

The host system 120 can be a computing device such as a desktop computer, laptop computer, network server, mobile device, embedded computer (e.g., one included in a vehicle, industrial equipment, or a networked commercial device), or such computing device that includes a memory and a processing device. The host system 120 can include or be coupled to the memory sub-system 110 so that the host system 120 can read data from or write data to the memory sub-system 110. The host system 120 can be coupled to the memory sub-system 110 via a physical host interface. Examples of a physical host interface include, but are not limited to, a serial advanced technology attachment (SATA) interface, a peripheral component interconnect express (PCIe) interface, universal serial bus (USB) interface, Fibre Channel, Serial Attached SCSI (SAS), etc. The physical host interface can be used to transmit data between the host system 120 and the memory sub-system 110. The host system 120 can further utilize an NVM Express (NVMe) interface to access the memory components 112A to 112N when the memory sub-system 110 is coupled with the host system 120 by the PCIe interface. The physical host interface can provide an interface for passing control, address, data, and other signals between the memory sub-system 110 and the host system 120.

The memory components 112A to 112N can include any combination of the different types of non-volatile memory components and/or volatile memory components. An example of non-volatile memory components includes a negative-and (NAND) type flash memory. Each of the memory components 112A to 112N can include one or more arrays of memory cells such as single level cells (SLCs), multi-level cells (MLCs), triple level cells (TLCs), or quad-level cells (QLCs). In some embodiments, a particular memory component can include both an SLC portion and another type (e.g., MLC, TLC, QLC) of portion of memory cells. Each of the memory cells can store one or more bits of data (e.g., data blocks) used by the host system 120. Although non-volatile memory components such as NAND type flash memory are described, the memory components 112A to 112N can be based on any other type of memory such as a volatile memory. In some embodiments, the memory components 112A to 112N can be, but are not limited to, random access memory (RAM), read-only memory (ROM), dynamic random access memory (DRAM), synchronous dynamic random access memory (SDRAM), phase change memory (PCM), magneto random access memory (MRAM), negative-or (NOR) flash memory, electrically erasable programmable read-only memory (EEPROM), and a cross-point array of non-volatile memory cells. A cross-point array of non-volatile memory can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. Furthermore, the memory cells of the memory components 112A to 112N can be grouped as a group of memory cells, word lines, word line groups (e.g., multiple word lines in a group), or pages that can refer to a unit of the memory component used to store data. With some types of memory (e.g., NAND), pages can be grouped to form blocks.

The memory system controller 115 (hereinafter referred to as "controller") can communicate with the memory components 112A to 112N to perform operations such as reading data, writing data, or erasing data at the memory components 112A to 112N and other such operations. The controller 115 can include hardware such as one or more integrated circuits and/or discrete components, a buffer memory, or a combination thereof. The controller 115 can be a microcontroller, special purpose logic circuitry (e.g., a field programmable gate array (FPGA), an application specific integrated circuit (ASIC), etc.), or other suitable processor. The controller 115 can include a processor (e.g., processing device) 117 configured to execute instructions stored in local memory 119. In the illustrated example, the local memory 119 of the controller 115 includes an embedded memory configured to store instructions for performing various processes, operations, logic flows, and routines that control operation of the memory sub-system 110, including handling communications between the memory sub-system 110 and the host system 120. In some embodiments, the local memory 119 can include memory registers storing memory pointers, fetched data, etc. The local memory 119 can also include read-only memory (ROM) for storing micro-code. While the example memory sub-system 110 in FIG. 1 has been illustrated as including the controller 115, in another embodiment of the disclosure, a memory sub-system 110 cannot include a controller 115, and can instead rely upon external control (e.g., provided by an external host, or by a processor or controller separate from the memory sub-system).

In general, the controller 115 can receive commands or operations from the host system 120 and can convert the commands or operations into instructions or appropriate commands to achieve the desired access to the memory components 112A to 112N. The controller 115 can be responsible for other operations such as wear leveling operations, garbage collection operations, error detection and error-correcting code (ECC) operations, encryption operations, caching operations, and address translations between a logical address (e.g., logical block address (LBA) and a physical address (e.g., physical block address) that are associated with the memory components 112A to 112N. The controller 115 can further include host interface circuitry to communicate with the host system 120 via the physical host interface. The host interface circuitry can convert the commands received from the host system into command instructions to access the memory components 112A to 112N as well as convert responses associated with the memory components 112A to 112N into information for the host system 120.

The memory sub-system 110 can also include additional circuitry or components that are not illustrated. In some embodiments, the memory sub-system 110 can include a cache or buffer (e.g., DRAM) and address circuitry (e.g., a row decoder and a column decoder) that can receive an address from the controller 115 and decode the address to access the memory components 112A to 112N.

Any one of the memory components 112A to 112N can include a media controller (e.g., media controller 130A and media controller 130N) to manage the memory cells of the memory component 112, to communicate with the memory sub-system controller 115, and to execute memory requests (e.g., read or write) received from the memory sub-system controller 115.

The memory sub-system 110 includes a block allocation component 113 that performs operations as described herein. In some embodiments, the block allocation component 113 can be part of host system 120, controller 115, memory component 112A-112N, an operating system, or an application. Block allocation component 113 can dynamically allocate of one or more blocks from a pool of storage area blocks of one or more memory components 112A-112N for use as purposed blocks. For example, the controller 115 can include a processor 117 (processing device) configured to execute instructions stored in local memory 119 for performing the operations described herein.

In some embodiments, the memory components 112A to 112N can be managed memory devices (e.g., managed NAND), which is a raw memory device combined with a local controller (e.g., media controller 130) for memory management within the same memory device package. A media controller 130 can include a block allocation component 113.

Figure 1B:
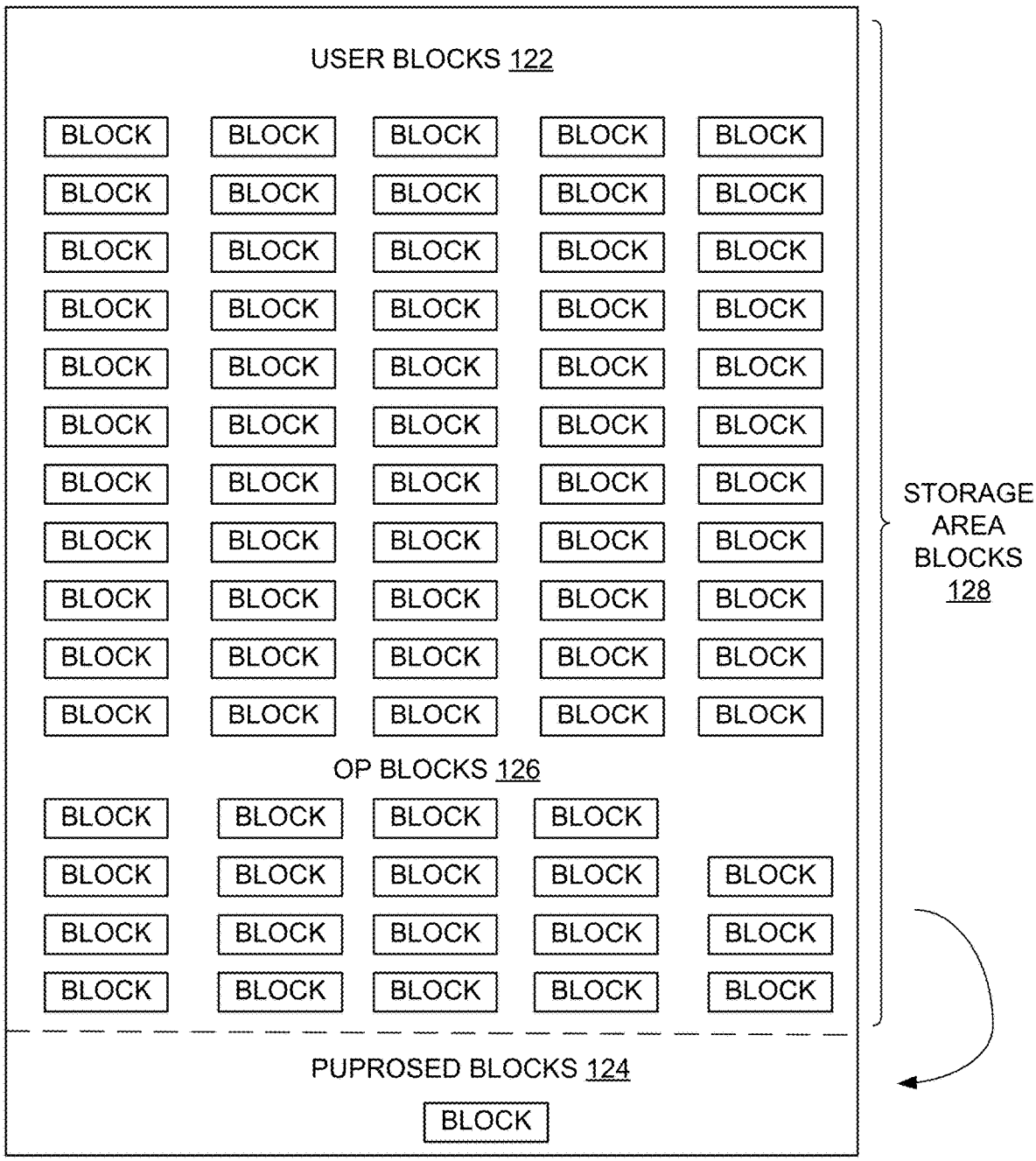
FIG. 1B illustrates the blocks of a memory sub-system, in accordance with embodiments of the disclosure.

FIG. 1B illustrates the blocks of a memory sub-system, in accordance with embodiments of the disclosure. In some embodiments, blocks 120 can logically represent all the blocks of a memory sub-system, such as memory sub-system 110. In some embodiments, the blocks 120 can be part of one or more memory components 112A-112N of memory sub-system 110. Blocks 120 can include a pool of storage area blocks 128 and purposed blocks 124. In some embodiments, storage area blocks 128 can include a pool of user blocks 122 and a pool of over provisioning blocks 126. In accordance with aspects of the disclosure, one or more blocks from the storage area blocks 124 can be dynamically allocated to the purposed blocks 124 in accordance with the aspects of the disclosure. Examples of purposed blocks 124 can be parity blocks, blocks that temporary data related to an application, such as a scratch pad application, or temporary system data.

In some embodiments, a memory component in a memory sub-system can include memory cells. A memory cell can include one or more memory pages (also referred to herein as "pages") for storing one or more bits of binary data corresponding to data received from a host system. One or more memory cells of the memory component can be grouped together to form a block. For example, one or more pages of a memory component can be grouped together to form a block. One or more blocks can be grouped together to form a plane of the memory component in order to allow concurrent operations (e.g., parallelism) to take place on each plane. A physical die can include one or more planes. A physical memory component (e.g., such as a memory component that in its own discrete physical package with external pins or electrical contacts) can have one or more physical die.

In some embodiments, a single-level cell (SLC) can store only one bit per memory cell, whereas a multi-level cell (MLC) is a memory cell that is capable of storing more than a single bit of information. It should be noted that the state of the memory cell can be programmed and the state of the memory cell can be determined by comparing a read voltage of the memory cell against one or more read level thresholds. That is, with SLC NAND flash technology, each cell can exist in one of two states, storing one bit of information per cell, whereas MLC NAND flash memory has four or more possible states per cell, so each MLC-based cell can store two or more bits of information per cell. The higher number of possible states reduces the amount of margin (e.g., valley margin or voltage range) separating the states. The memory device can include triple-level cell (TLC) memory. In TLC memory, the memory cell stores three bits of information per cell with eight total voltage states. The memory device can include a quad-level cell (QLC) memory. In QLC memory, each memory cell can store four bits of information with sixteen voltage states. For example, in a QLC memory, a memory cell can store four bits of data (e.g., 1111, 0000, 1101, etc.) corresponding to data received from the host system using the sixteen voltage states. A memory component can be operated in one or more modes. For example, some memory cells of the memory component can operate in a single-bit mode, such as SLC mode, while other memory cells concurrently operation in a multi-bit mode, such as TLC mode.

In some embodiments, each type of memory cell can have a different endurance for storing data. The endurance of the memory component is the number of write operations or a number of program/erase (PE) cycles performed on a memory cell of the memory component before data can no longer be reliably stored at the memory cell. For example, SLC memory cells that have a lower data density can have an endurance threshold of 80×N PE cycles whereas TLC memory cells that have a higher data density can have an endurance threshold of 4×N PE cycles.

In some embodiments, garbage collection is a process that identifies which blocks contain unneeded data (i.e., stale data) and writes the data elsewhere so the block can be erased. The efficiency of garbage collection operations can often be a function of the physical size of memory components in excess of the logical size of the memory component that is exposed as user space (e.g., Over Provisioning, or OP). For example, a memory sub-system can have 64 Gigabytes (GB) of user space (also referred to as "user blocks"). In addition to the 64 GB of user blocks, an additional 4%-5% (e.g., 3 GB) of memory can be included in addition to the user blocks and be used as over provisioning blocks. During garbage collection operations, the additional OP helps reduce the garbage collection effort and subsequently PE cycles. For example, for a memory component that exposes a user space size of 128 GB, if the physical size is 140 GB, the OP is 12 GB. In such instances, garbage collection operations can become less efficient than for components with the same user space size.

In some embodiments, data striping can refer to a technique of storing data by segmenting logically sequential data so that consecutive segments are stored on different storage devices or different parts of the same storage device (e.g., on different planes of the same storage device). For instance, a block stripe can include a logical group of blocks where no more than one block from each plane of one or more memory components is part of the block stripe. Data striping allows for performance improvements at least because the data striping allows the data to be written and read in parallel, which increases throughput and improves performance of data processing. The reliability of a data stripe can be enhanced by including parity. Parity can refer to a technique of error detecting, and can include error detecting code. Parity, such as parity stored at one or more parity blocks, can allow for one or more error to be detected or corrected at a data stripe. Parity can be associated with each data stripe. For example, a block stripe can use one or more parity blocks to store parity data for the block stripe.

An example of a data striping technique is redundant array of independent NAND (RAIN) operations that write one or more RAIN stripes. RAIN can refer to a data protection scheme for generating and writing data to NAND media. A RAIN stripe can be associated with RAIN parity. For example, data of RAIN stripe can be written to multiple user blocks across multiple planes of one or more memory components. An exclusive OR (XOR) operation can be performed on the data of each successive block of the RAIN stripe until the RAIN stripe is closed (e.g., all the data of the stripe has been written). For instance, an XOR operation is performed on the first user block and the second user block of the RAIN stripe to produce a first XOR value. Subsequent to writing the third user block of the RAIN stripe, an XOR operation is performed on the first XOR value and the third user block to produce a second XOR value, and so forth.

In some conventional memory sub-systems, the total number of parity blocks used over the life of a memory sub-system are allocated as a manufacturing default at time zero. The allocated parity blocks are used to store parity data for data stripes written at the memory sub-system. The parity data is stored at a parity block (s) for the life of a respective data stripe (e.g., parity data is stored at a data block for the entire time the respective data stripe is stored at the memory sub-system). For example, if 10 parity blocks are used over the life of the memory sub-system, the 10 parity blocks are allocated at the beginning of operation of the memory sub-system. In the aforementioned conventional memory sub-systems, allocating the total number of parity blocks used over the life of the memory sub-system decreases the amount of OP available to perform garbage collection operations, which increases write amplification and negatively impacts the performance of the memory sub-system.

Aspects of the disclosure address the above challenges, as well as other challenges, by dynamically allocating one or more blocks from a pool of storage area blocks for use as purposed blocks. In some embodiments, one or more blocks from a pool of storage area blocks of the memory component are allocated as an initial set of purposed blocks. The purposed blocks are used to store purposed data of initial data stored as initial data stripes. Subsequent to writing the initial data to the initial data stripes, a determination is made as to whether the blocks of the initial set of purposed blocks satisfy a condition indicating that the first set of purposed blocks are to be retired. For example, an indication of the endurance state of the purposed blocks can be evaluated to determine whether the purposed blocks are still reliable or have reached an end-of-life state. Responsive to determining that the blocks are to be retired, one or more other blocks from the pool of storage area blocks are allocated to a subsequent set of purposed blocks, and the initial set of purposed blocks are retired. The subsequent set of purposed blocks can be used to store purposed data for subsequent data stripes.

In some embodiments, the memory sub-system can operate using a "temporary parity scheme." Rather than keeping the parity data for the entire life of the respective data stripe, the parity data can be stored "temporarily" at a parity block. Before the respective data of the data stripe is garbage collected, the parity block can be re-used to store parity data of a subsequent data stripe. For example, bit errors at a particular block often originate from a program operation on the particular block. For instance, a page of a block can be programmed. While the block is open (e.g., the block has not been fully written), another page of the block can be programmed, which can disturb the bits of the previously programmed page of the same block. A temporary parity scheme can store the parity data of a block until the contents of the block are validated. Once the data of the block has been validate, the parity data is not needed and the respective parity block can be re-used to store parity data for another data stripe. For instance, a block can be fully written with data and subsequently closed. After closing the block, the data of the block can be read and compared against the actual data stored in volatile memory. If there are no uncorrectable bit errors at the block, the associated parity data can be "flushed" and the respective parity block can be re-used.

In some embodiments, the pool of storage area blocks (e.g., pool of OP blocks) operate in multi-bit mode (e.g., TLC mode) or single-bit mode, and the purposed blocks operate in a single-bit mode (e.g., SLC mode). When a purposed block(s) is retired, a new purposed block(s) is allocated from the pool of storage area blocks operating in multi-bit mode. The new purposed block(s) is then operated in single-bit mode, which has an endurance greater than blocks operating in multi-bit mode.

Dynamic allocation of purposed blocks, as described herein, can improve memory sub-system performance of a memory sub-system by allowing for more blocks to be allocated to the storage area pool for at least a portion of the lifetime of the memory sub-system, which decreases write amplification and improves the performance of the memory sub-system. Additionally, dynamic allocation of purposed blocks can improve a memory sub-system performance by providing additional data blocks to user space for at least a portion of the lifetime of the memory sub-system, which improves the user-space capacity of the memory sub-system.

It can be noted that the disclosure describes embodiments in terms of blocks, for purposes of illustration rather than limitation. Aspects of the disclosure can be applied to any size data unit of a memory component. It can also be noted that the disclosure describes embodiments as allocating purposed blocks from a pool of storage area blocks, for purposes of illustration rather than limitation. Parity blocks can also be allocated from other domains. It can be noted that a "set" as described herein can refer to one or more items. For example, a set of purposed blocks can include one or more blocks.

In operational mode (e.g., when in operation in the field), aspects of the disclosure can be run dynamically to extend the usable lifetime of the memory components of the memory sub-system. The term "dynamic" as used herein can refer to processes, functions, operations, or implementations that occur during operation, usage, or deployment of a corresponding device, system, memory sub-system, or embodiment, and after or while running the manufacturer's or third-party firmware. The dynamically occurring processes, functions, operations, or implementations can occur after or subsequent to design, manufacture, and initial testing, setup or configuration (e.g., after test mode).

Figure 1C:
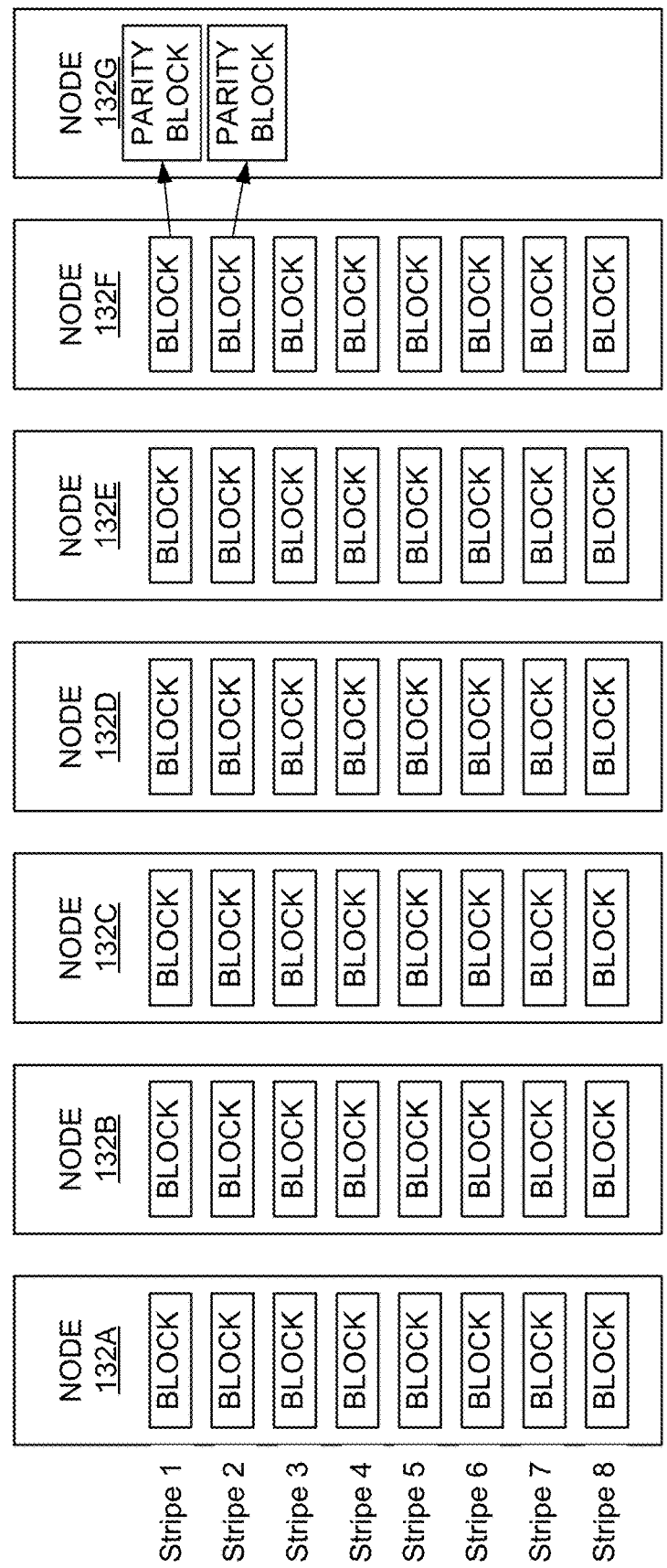
FIG. 1C illustrates data stripes, in accordance with embodiments of the disclosure.

FIG. 1C illustrates data stripes, in accordance with embodiments of the disclosure. Data stripes 130 illustrates 8 data stripes labeled stripe 1-8. The row of blocks directly to the right of the stripe label indicate the blocks that are part of the respective stripe. For example, stripe 1 includes the first row of blocks of node 132A-132F and the first purposed (e.g., parity) block of node 132G. Node 132A represent segments of memory that are used in the striping of data and can be different for different striping techniques. For example, a node can represent a plane, a die, a memory component. In another example, the particular striping technique can stripe data on different planes. The nodes 132A-132G can represent different planes at one or more memory components. In another example, the particular striping technique can stripe data on different die. The nodes 132A-132G can represent different die at one or more memory components. In some embodiments, the nodes 132A-132G can be at the same memory sub-system or different memory sub-systems. Node 132G shows that some data stripes (e.g., data stripe 1-2) have a respective purposed (e.g., parity) block(s) and some data stripes (e.g., stripe 3-8) do not have a respective purposed (e.g., parity) block to illustrate a temporary parity scheme as described above with respect to FIG. 1B.

Figure 2A:
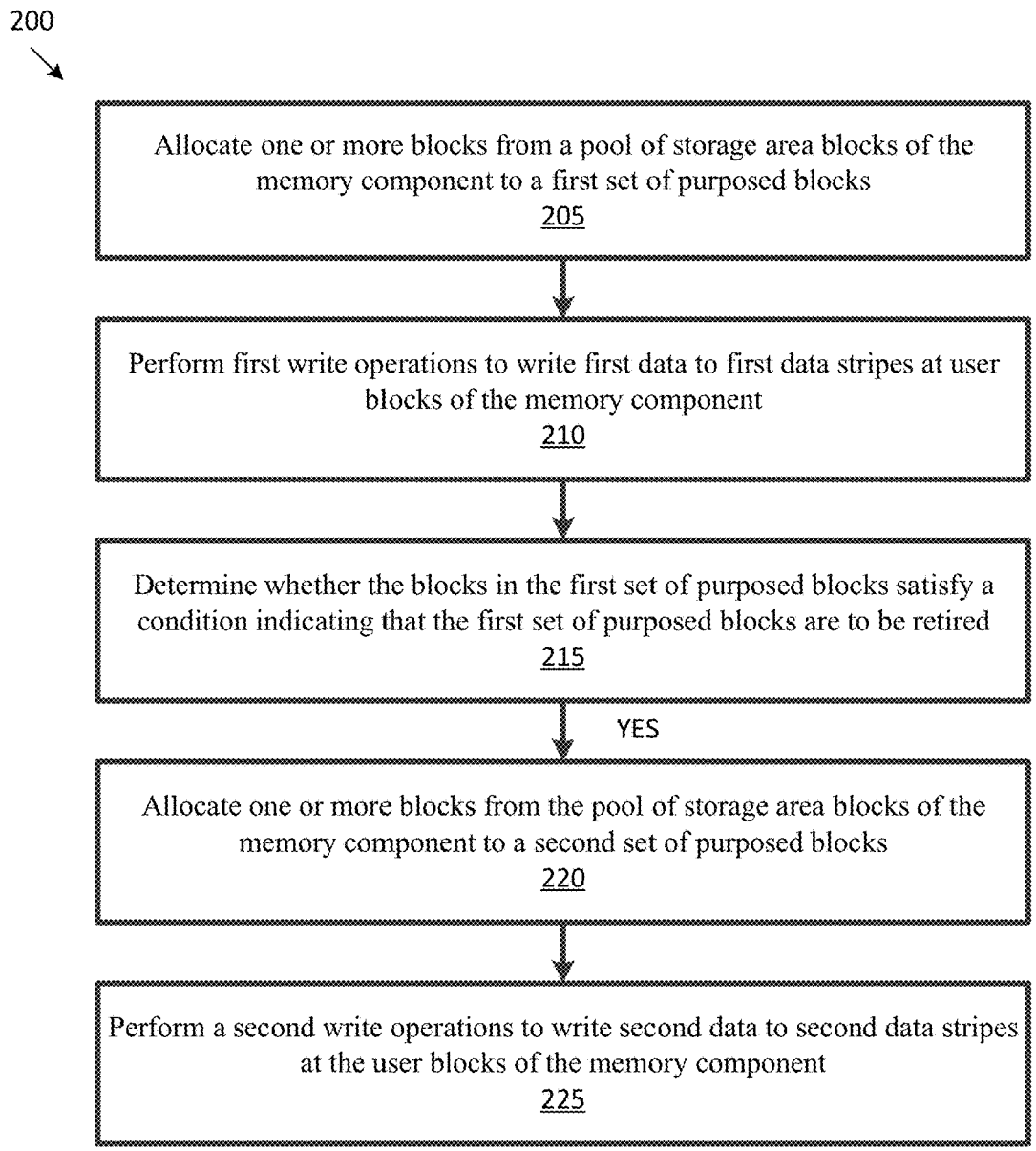
FIG. 2A is a flow diagram of an example method for allocating one or more blocks from a pool of storage area blocks for use as purposed blocks, in accordance with some embodiments of the disclosure.
Figure 2B:
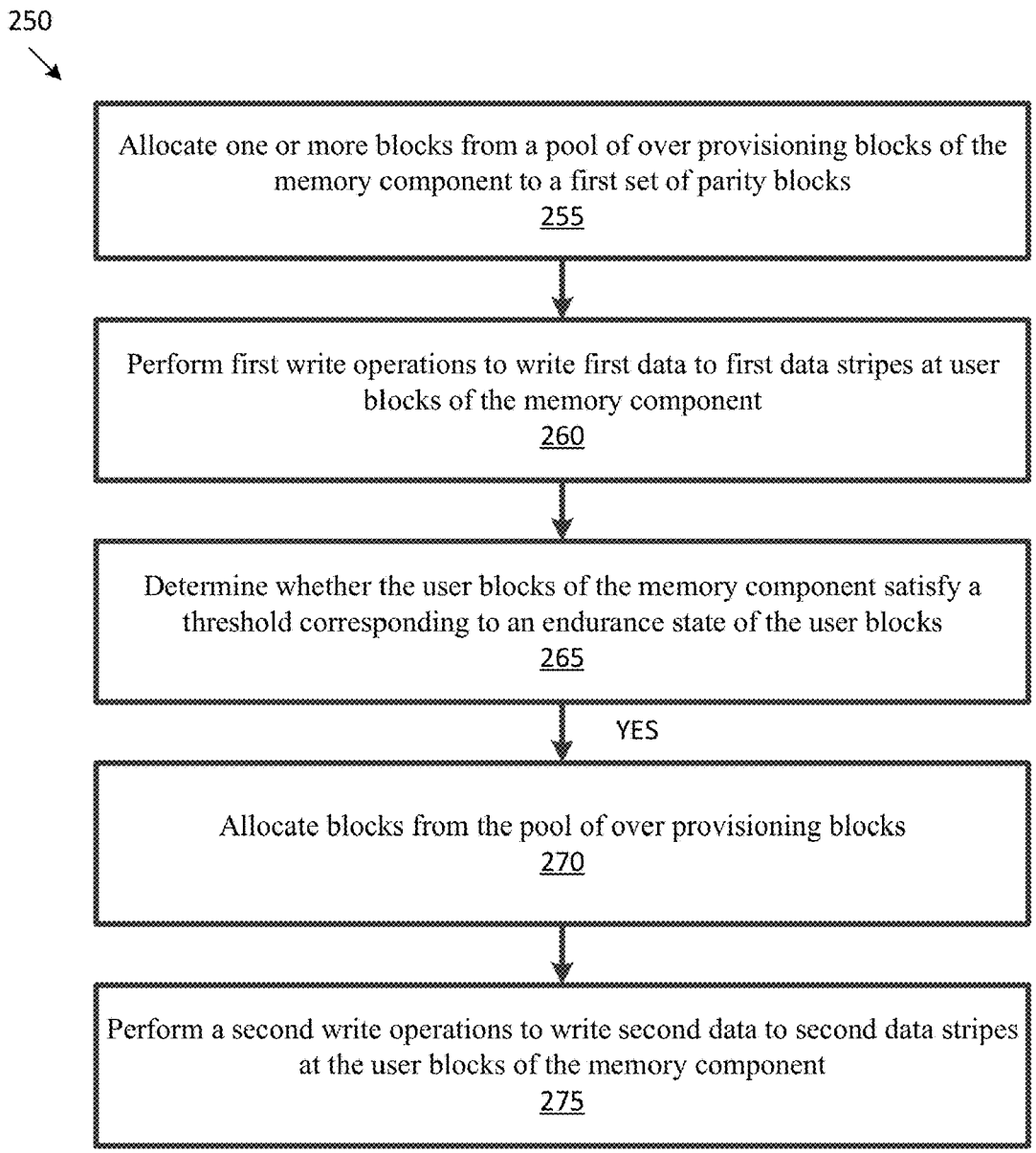
FIG. 2B is a flow diagram of an example method for allocating one or more blocks from a pool of over provisioning block for use as parity blocks, in accordance with some embodiments of the disclosure.

FIG. 2A and FIG. 2B illustrate method 200 and method 250, respectively. The method 200 or method 250 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, method 200 or method 250 is performed by the block allocation component 113 of FIG. 1A. Although shown in a particular order, unless otherwise specified, the order of the operations can be modified. Thus, the illustrated embodiments should be understood only as examples, and the illustrated operations can be performed in a different order, and some operations can be performed in parallel. Additionally, one or more operations can be omitted in various embodiments. Thus, not all operations are required in every embodiment. Other operations flows are possible. In some embodiments, different operations can be used.

FIG. 2A is a flow diagram of an example method for allocating one or more blocks from a pool of storage area block for use as purposed (e.g., parity) blocks, in accordance with some embodiments of the disclosure.

At operation 205, processing logic performing method 200 allocates one or more blocks from a pool of storage area blocks of the memory component to a first set of purposed blocks.

At operation 210, processing logic performs first write operations to write first data to first data stripes at user blocks of the memory component. In some embodiments, the first set of purposed blocks are to store purposed (e.g., parity) data of the first data stripes associated with the first write operations.

In some embodiments, to perform the first write operations to write the first data to the first data stripes at the user blocks of the memory component, processing logic performs a first write operation of the first write operations to write a first portion of the first data to a data stripe of the first data stripes at the user blocks of the memory component. The purposed (e.g., parity) data of the data stripe of the first data stripes is stored at the first set of purposed blocks.

In some embodiments, processing logic, validates that the data stripe of the first data stripes that has been written at the user blocks of the memory component is absent of uncorrectable bit errors. In some examples, an uncorrectable bit error is bit value error (e.g., reads a logical "1" rather than a logical "0" and vice versa) that cannot be corrected by an error correction technique, such as ECC. In some embodiments, processing logic validates that the data stripe of the first data stripes that has been written at the user blocks of the memory component is absent of bit errors. For example, if any bit errors or a threshold number of bit errors are detected in the data stripe, processing logic does not validate the data stripe. It can be noted that in some embodiments, validation can be performed on a more granular level. For instance, processing logic can validate one or more blocks of a data stripe. In some embodiments, processing logic can validate one or more blocks of the data stripe while the data stripe is open (e.g., before it is closed) or after the data stripe is closed. In some embodiments, the validation operation is performed to validate one or more blocks of the data stripe (e.g., or the entire data stripe). The validation operation can read data written at the user blocks of the memory component and compare the data to the actual user data. The actual user data can be stored in volatile memory, such as a buffer, and is used to write the user data at the memory component. An open data stripe can refer to a data stripe that is being used for write operations where the stripe contains one or more open blocks. A closed data stripe can refer to a data stripe that has been fully written. An open block can refer to a block that is being used for write operations and data has not yet fully been written to the block (e.g., one or more pages of the same block have not been programmed). A closed block can refer to a block that has been fully written.

In some embodiments, responsive to validating that the data stripe of the first data stripes that has been written at the user blocks of the memory component is absent of the uncorrectable bit errors, processing logic performs an erase operation to erase the first set of purposed blocks. In some embodiments, processing logic performs a second write operation of the first write operations to write a second portion of the first data to another data stripe of the first data stripes at the user blocks of the memory component. The purposed (e.g., parity) data of the other data stripe is written and stored at the first set of purposed blocks subsequent to performing the erase operation at the first set of purposed blocks.

In some embodiments, the first write operations to write the first data to the first data stripes at the user blocks of the memory component are redundant array of independent NAND (RAIN) operations. The one or more purposed blocks associated with a RAIN stripe can be RAIN parity blocks.

In some embodiments, the first set of purposed blocks include a minimum number of purposed blocks that can store purposed (e.g., parity) data for a maximum number of open user blocks at any given time (e.g., temporary parity scheme). In some embodiments, first set of purposed blocks include fewer purposed blocks than a total number of purposed blocks used over a lifetime of the memory component.

At operation 215, processing logic determines whether the blocks in the first set of purposed blocks satisfy a condition indicating that the first set of purposed blocks are to be retired. If processing logic determines that the blocks in the first set of purposed blocks satisfy the condition, processing logic, proceeds to operation 220. If processing logic determines that the blocks in the first set of purposed blocks do not satisfy the condition, processing logic continues at operation 210.

In some embodiments, to determine whether the blocks in the first set of purposed blocks satisfy the condition, processing logic determines a raw bit error rate (RBER) associated with the first set of purposed blocks. Processing logic determines whether the RBER associated with the first set of purposed blocks satisfies a threshold (e.g., greater than or equal to a threshold RBER value). In some embodiments, responsive to determining that RBER associated with the first set of purposed blocks satisfies the threshold, processing logic retire the first set of purposed blocks. For example, processing logic can remove the purposed blocks from future use so that the blocks are no longer used to store new data. RBER corresponds to a number of bit errors per unit of time that the data stored at the data block experiences.

In some embodiments, to determine whether the blocks in the first set of purposed blocks satisfy the condition, processing logic determines the number of program-erase (PE) cycles associated with the first set of purposed blocks. A program-erase cycle can refer to one or more operations (e.g., program or erase operation) in which data is written to the memory component and subsequently erased. Processing logic determines whether the PE cycle satisfies a threshold (e.g., greater than or equal to a threshold number of PE cycles). Responsive to determining that the number of PE cycles satisfies the threshold, processing logic can retire the first set of purposed blocks.

In some embodiments, to determine whether the blocks in the first set of purposed blocks satisfy the condition, processing logic can determine a metric indicative of the endurance state of the first set of purposed blocks. Processing logic determines whether the metric satisfies a threshold (e.g., greater than or equal to an endurance threshold). Responsive to determining that the metric satisfies the threshold, processing logic can retire the first set of purposed blocks. A block can have a limited lifetime. Endurance can refer to the useful life of unit of memory (e.g., block) within which the unit of memory can be reliably written (e.g., if written as a "0" or "1" the memory component retrains the state). The endurance state can indicate where in the spectrum of endurance (e.g., new, near retirement, time to retire) the unit of memory operates. Many metrics can be used to indicate the endurance state, including but not limited to, RBER, PE cycle count, total amount of data written, and so forth.

At operation 220, processing logic allocates one or more other blocks from the pool of storage area blocks of the memory component to a second set of purposed blocks. In some embodiments, allocating the one or more of the other blocks from the pool of storage area blocks is responsive to determining that the blocks in the first set of purposed blocks satisfy the condition indicating that the first set of purposed blocks are to be retired. In some embodiments, responsive to determining that the blocks in the first set of purposed blocks satisfy the condition, processing logic indicates that the blocks in the first set of purposed blocks are to be retired.

At operation 225, processing logic performs second write operations to write second data to second data stripes at the user blocks of the memory component. The second set of purposed blocks are to store purposed (e.g., parity) data of the second data stripes associated with the second write operations.

In some embodiments, the second write operations to write the second data to the second data stripes at the user blocks of the memory component are RAIN operations to write RAIN stripes.

In some embodiments, the user blocks of the memory component at which the first data stripes or the second data stripes are written operate in a multi-bit mode (XLC) (e.g., more than 1 bit, such as MLC, TLC, QLC). In some embodiments, the blocks in the first set of purposed blocks or the other blocks in the second set of purposed blocks operate in a single-bit mode (e.g., SLC mode). In some embodiments, the pool of storage area blocks operate in multi-bit mode.

Figure 3:
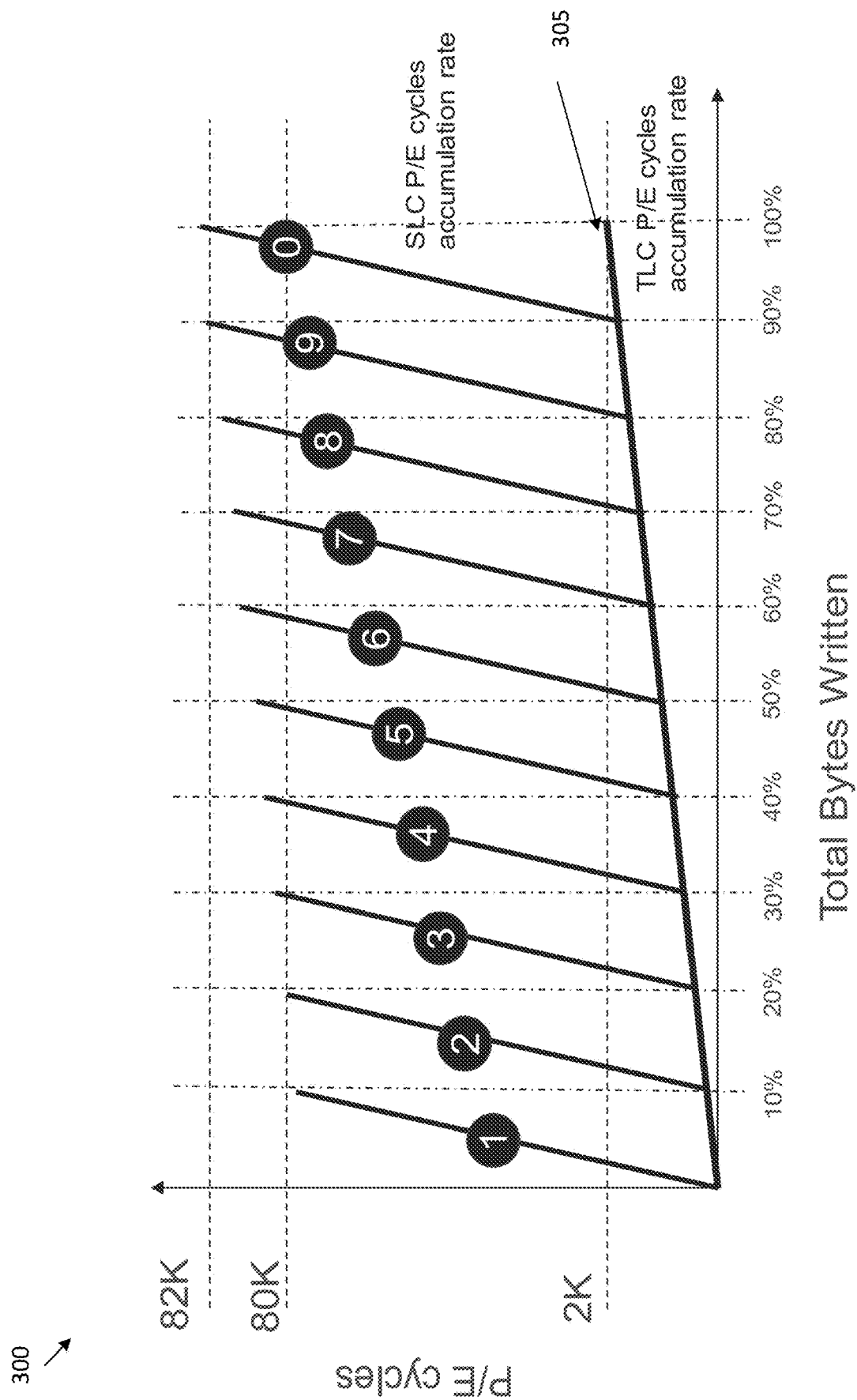
FIG. 3 is a diagram illustrating full dynamic allocation of one or more blocks from a pool of storage area blocks for use as purposed blocks, in accordance with some embodiments of the disclosure.
Figure 4:
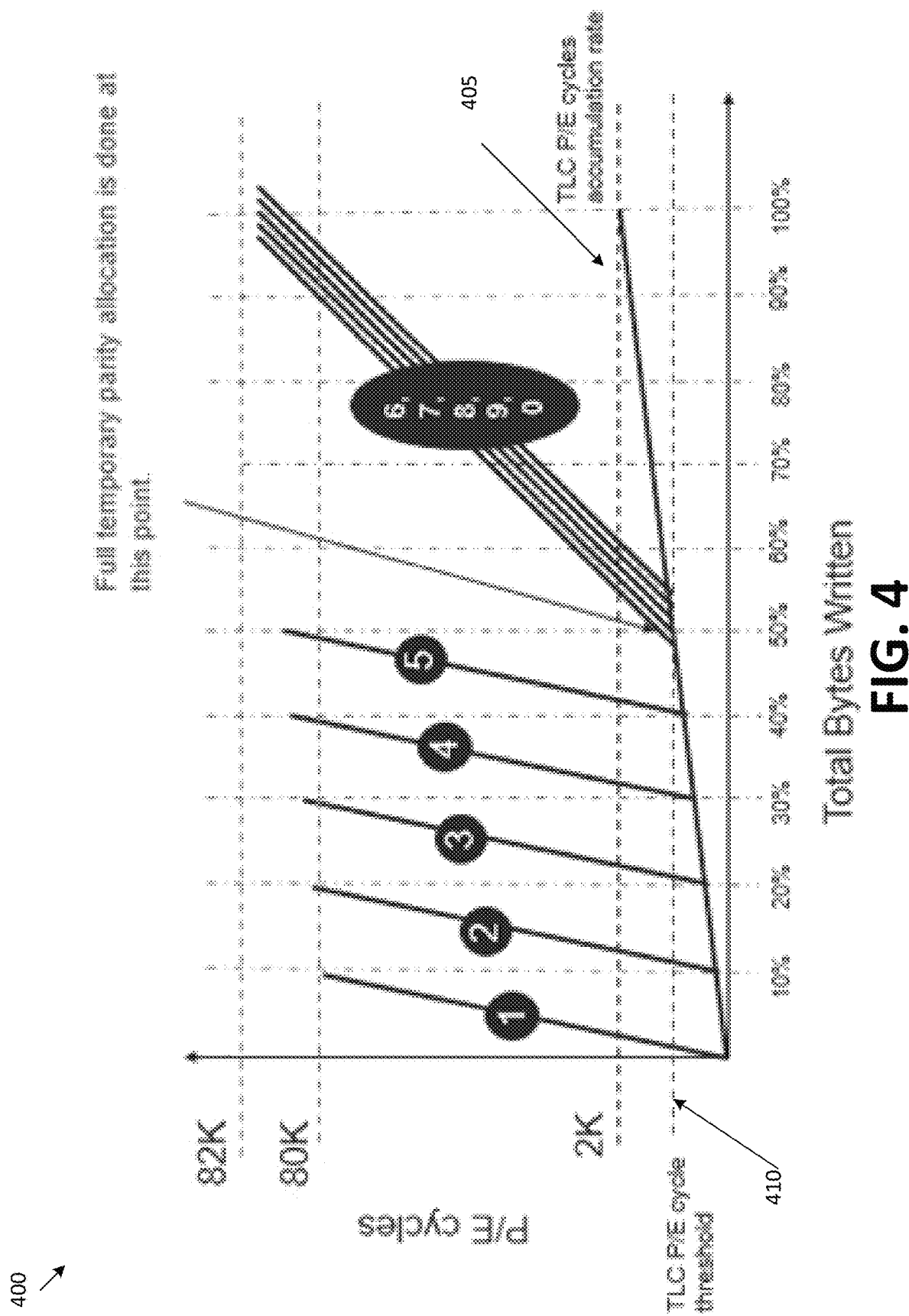
FIG. 4 is a diagram illustrating partial dynamic allocation of one or more blocks from a pool of storage area blocks for use as purposed blocks, in accordance with some embodiments of the disclosure.
Figure 5:
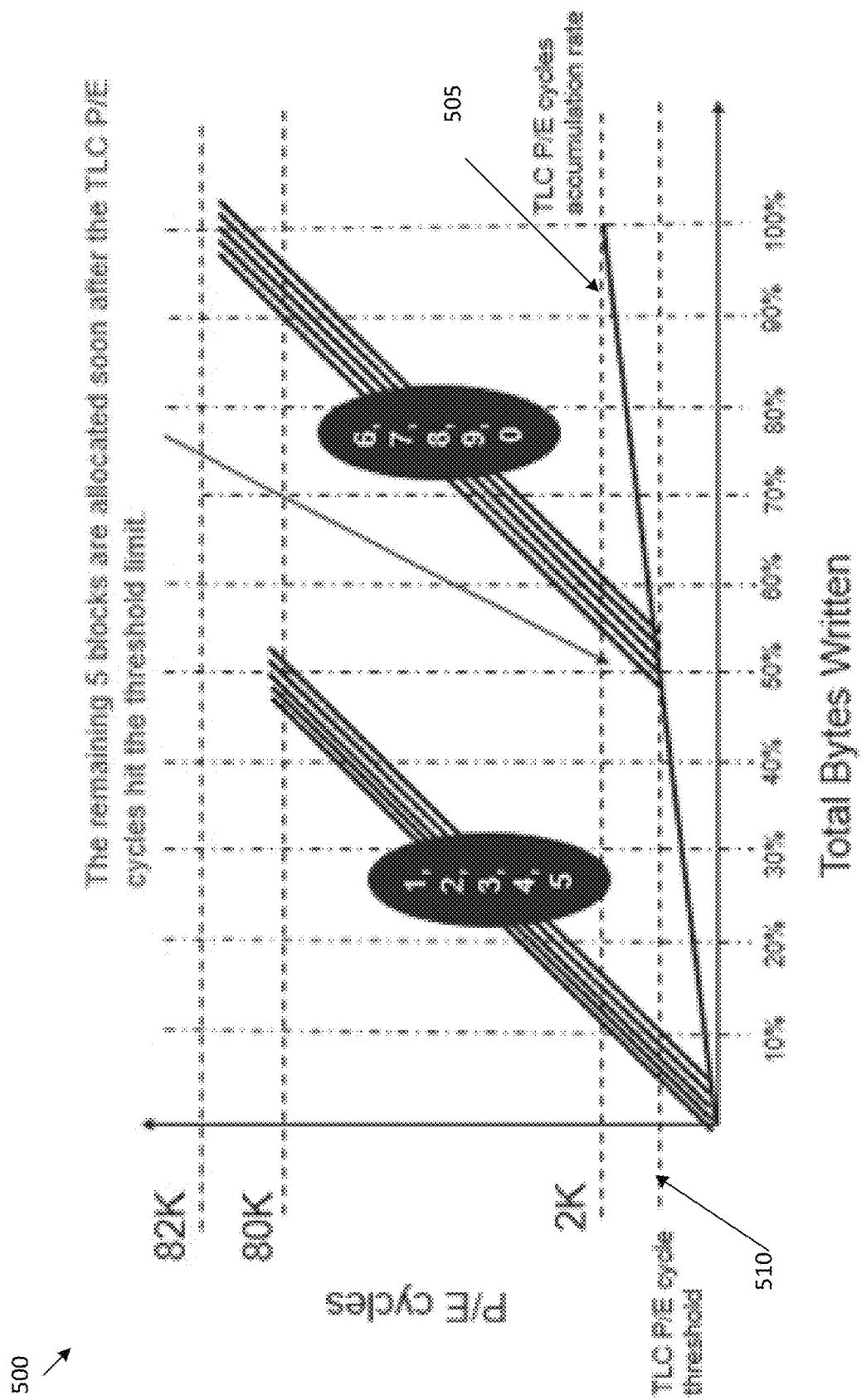
FIG. 5 is a diagram illustrating multi-phase dynamic allocation of one or more blocks from a pool of storage area blocks for use as purposed blocks, in accordance with some embodiments of the disclosure.

Operations of method 200 are further described with respect to FIGS. 3, 4, and 5.

FIG. 2B is a flow diagram of an example method for allocating one or more blocks from a pool of over provisioning block for use as parity blocks, in accordance with some embodiments of the disclosure. It can also be noted that operations and elements of method 200 can also be applied or used in conjunction with operations described with respect to FIG. 2B.

At operation 255, processing logic performing method 250 allocates one or more blocks from a pool of over provisioning blocks of the memory component to a first set of parity blocks.

In some embodiments, to allocate the one or more blocks from the pool of over provisioning blocks of the memory component to the first set of parity blocks, processing logic can allocate a number of blocks from the pool of over provisioning blocks that equal a minimum number of parity blocks that can store parity data for a maximum number of open user blocks at any given time (e.g., temporary parity scheme). Allocating a number of blocks from the pool of over provisioning blocks that equal a minimum number of parity blocks that can store parity data for a maximum number of open user blocks at any given time is further described with respect to FIGS. 3 and 4.

In some embodiments, to allocate the one or more blocks from the pool of over provisioning blocks of the memory component to the first set of parity blocks, processing logic allocates a number of blocks from the pool of over provisioning blocks that is greater than a minimum number of parity blocks that can store parity data for a maximum number of open user blocks at any given time and less than the total number of parity blocks that are to be used over the lifetime of the memory component. The aforementioned embodiment(s) is further described with respect to FIG. 5.

In some embodiments, the first set of parity blocks include fewer parity blocks than the total number of parity blocks that are used over the lifetime of the memory component. The aforementioned embodiment is further described with respect to FIGS. 3, 4, and 5.

At operation 260, processing logic performs first write operations to write first data to first data stripes at user blocks of the memory component. In some embodiments, the first set of parity blocks are to store parity data of the first data stripes associated with the first write operations.

In some embodiments, the first write operations to write the first data to the first data stripes at the user blocks of the memory component are redundant array of independent NAND (RAIN) operations to write multiple RAIN stripes.

In some embodiments, to perform the first write operations to write the first data to the first data stripes at the user blocks of the memory component, processing logic performs a first write operation of the first write operations to write a first portion of the first data to a data stripe of the first data stripes at the user blocks of the memory component. The parity data of the data stripe of the first data stripes is stored at the first set of parity blocks.

In some embodiments, processing logic, validates that the data stripe of the first data stripes that has been written at the user blocks of the memory component is absent of uncorrectable bit errors. In some embodiments, processing logic validates that the data stripe of the first data stripes that has been written at the user blocks of the memory component is absent of bit errors. For example, if any bit errors or a threshold number of bit errors are detected in the data stripe, processing logic does not validate the data stripe. It can be noted that in some embodiments, validation can be performed on a more granular level. For instance, processing logic can validate one or more blocks of a data stripe. In some embodiments, processing logic can validate one or more blocks of the data stripe while the data stripe is open (e.g., before it is closed). In some embodiments, the validation operation is performed to validate one or more blocks of the data stripe (e.g., or the entire data stripe).

In some embodiments, responsive to validating that the data stripe of the first data stripes that has been written at the user blocks of the memory component is absent of the uncorrectable bit errors, processing logic performs an erase operation to erase the first set of parity blocks. In some embodiments, processing logic performs a second write operation of the first write operations to write a second portion of the first data to another data stripe of the first data stripes at the user blocks of the memory component. The parity data of the other data stripe is stored at the first set of parity blocks subsequent to performing the erase operation at the first set of parity blocks.

In some embodiments, subsequent to performing operation 260 and prior to performing operation 265, processing logic can determine whether the first set of parity blocks satisfy a condition indicating that the first set of parity blocks are to be retired. Responsive to determining that the first set of parity blocks satisfy the condition, processing logic can indicate that the blocks in the first set of parity blocks are to be retired and allocate one or more blocks from the pool of over provisioning blocks of the memory component to a third set of parity blocks. Processing logic can perform a third plurality of write operations to write third data to a third plurality of data stripes at the user blocks of the memory component. The third set of parity blocks are to store parity data of the third data stripes associated with the third write operations. The aforementioned embodiment is further described with respect to FIGS. 3 and 4.

In some embodiments, to determine whether the first set of parity blocks satisfy the condition indicating that the first set of parity blocks are to be retired, processing logic determines a raw bit error rate (RBER) associated with the first set of parity blocks. Processing logic determines whether the RBER associated with the first set of parity blocks satisfies a threshold. Responsive to determining that RBER associated with the first set of parity blocks satisfies the threshold, processing logic retires the first set of parity blocks.

At operation 265, processing logic determine whether the user blocks of the memory component satisfy a threshold corresponding to an endurance state of the user blocks. In some embodiments, responsive to determining that the user blocks of the memory component satisfy a threshold corresponding to an endurance state of the user blocks, processing logic proceeds to operation 270. In some embodiments, responsive to determining that the user blocks of the memory component does not satisfy a threshold corresponding to an endurance state of the user blocks, processing logic can return to operation 260 an perform additional write operation(s) of the first write operations.

In some embodiments, to determine whether the user blocks of the memory component satisfy a threshold corresponding to an endurance state of the user blocks, processing logic can determine a metric indicative of the endurance state of the user blocks. Processing logic determines whether the metric satisfies a threshold (e.g., greater than or equal to an endurance threshold).

Determine whether the user blocks of the memory component satisfy a threshold corresponding to an endurance state of the user blocks is further described with respect to FIGS. 4 and 5, and above with respect to FIG. 2A.

At operation 270, processing logic allocates blocks from the pool of over provisioning blocks. In some embodiments, processing logic allocates blocks from the pool of over provisioning blocks at least equal to a remaining number of parity blocks of a total number of parity blocks that are used over a lifetime of the memory component to a second set of parity blocks. Embodiments using the remaining number of parity blocks of the total number of parity blocks that are used over a lifetime of the memory component are further described with respect to FIGS. 4 and 5.

At operation 275, processing logic performs second write operations to write second data to second data stripes at the user blocks of the memory component. In some embodiments, the second set of parity blocks are to store parity data of the second data stripes associated with the second write operations.

In some embodiments, the second write operations to write the second data to the second data stripes at the user blocks of the memory component are RAIN operations to write a plurality of RAIN stripes.

In some embodiments, the user blocks of the memory component at which the first data stripes or the second data stripes are written operate in a multi-bit mode (XLC) (e.g., more than 1 bit, such as MLC, TLC, QLC). In some embodiments, the blocks in the first set of parity blocks or the other blocks in the second set of parity blocks operate in a single-bit mode (e.g., SLC mode). In some embodiments, the pool of over provisioning blocks operate in multi-bit mode.

FIGS. 3, 4, and 5 illustrate graph 300, 400, and 500, respectively. Graphs 300, 400, and 500 illustrate a vertical axis representing PE cycles, where the PE cycles increase from bottom to top. Graphs 300, 400, and 500 illustrate a horizontal axis represents total bytes written (TBW). TBW represents the total by written to a unit of memory, such as a block, during the life of a memory component or memory sub-system.

Graphs 300, 400, and 500 will be described using the following example for purposes of illustration, rather than limitation. As noted above, the memory sub-system can operate using a temporary data protection technique, such as a temporary RAIN technique. The minimum number of purposed blocks (e.g., SLC parity block) that are used at any given time (e.g., any given instance) can be determined by the maximum number of open user blocks (e.g., storage area blocks) at any given time. In one example, the memory sub-system can use 8 plane parallelism and the data protection technique, such as RAIN, can cover a single plane failure. The user block: parity block ratio is 8:1. If there are two open TLC blocks (e.g., user blocks operating in TLC mode) at any given time, the TLC blocks will use 2/8 TLC block parity size. The parity blocks can be operated in SLC mode, and the user blocks can be operated in TLC mode, which translates to the minimum number of parity blocks equaling to 3*2/8 SLC blocks (e.g., less than 1 SLC block in the current example). One block (e.g., operating in SLC mode) represents the minimum number of parity blocks used at any given time (e.g., minimum number of parity blocks that can store parity date for a maximum number of open user blocks at any given time). It can be noted that user blocks operating in TLC mode is used for purposes of illustration, rather than limitation. The memory can operate user blocks in any mode, such as any multi-bit mode. In some instances, the user blocks can operate in single-bit mode. It can also be noted that the parity blocks operating in SLC mode is used for purpose of illustration, rather than limitation. In some instances, the parity blocks can operate in a multi-bit mode.

The total number of parity blocks, such as the total number of SLC parity blocks used during the life time of the memory sub-system can be determined. In the current example, a 64 GB memory sub-system can have a TBW specification of 64 Terabytes (TB). The garbage collection write amplification is 2, which makes the garbage collection data equal to 128 TB. The total user data written to the memory sub-system over the life of the memory sub-system equals 194 TB (e.g., 64 TB of user data and 128 TB of garbage collection data). The total amount of parity data written during the life of the memory sub-system is 194 TB/8, which is roughly 24 TB. Assuming that the SLC endurance is 80,000 PE cycles, the size of the parity data over the life of the memory sub-system is roughly 24 TB/80 k=0.3 GB in SLC mode or 0.9 GB in TLC mode, which is roughly 1.5% of a 64 GB memory sub-system. Assuming that there are 700 blocks in a memory sub-system, 1.5% of the memory sub-system is equal to 10 blocks. The 10 blocks represent the total number of parity blocks that are to be used over the lifetime of the memory component (or memory sub-system).

In the current example and as noted above, the total number of parity blocks that are to be used over the lifetime of the memory component (or memory sub-system) is 10 blocks. The minimum number of parity blocks that can store parity date for a maximum number of open user blocks at any given time is 1 parity block. The TLC endurance is 2 k PE cycles. The SLC endurance is 80 k PE cycles. A block is capable of 80 k SLC PE cycles after performing N number of TLC PE cycles. The value of N can differ for one or more of graph 300, 400, and 500.

It can be noted that the parity block(s) are described herein as being allocated from a pool of storage area blocks for purposes of illustration, rather than limitation. In some embodiments, the parity blocks can be allocated from the user blocks.

FIG. 3 is a diagram illustrating full dynamic allocation of one or more blocks from a pool of storage area block for use as purposed blocks, in accordance with some embodiments of the disclosure. Continuing the above example, with respect to graph 300 a block is capable of 80 k SLC PE cycles after performing 2 k TLC PE cycles—a fully used TLC block can still be used for full SLC endurance. The graph 300 illustrates the minimum number of purposed blocks (e.g., SLC parity blocks) allocated at any given time (e.g., 1 SLC parity block). Graph 300 also illustrates that when an allocated purposed block (e.g., set of purposed blocks) hits an endurance limit (e.g., 80 k PE cycles), the purposed block is retired and a new block (e.g., new set of purposed blocks) is allocated from the TLC pool, such as the pool of storage area blocks. In graph 300, the memory sub-system can consume 1 SLC purposed block every $\frac{1}{10}^{th}$ of TBW. The effective over provisioning penalty at time zero is 0.14% and gradually advances to 1.4% at the end of life of the memory component (or memory sub-system).

In graph 300, line 305 represents the number of TLC PE cycles of the pool of storage area blocks and the user blocks over the TBW. The vertical lines with circles that extend from line 305 represent the allocation of a purposed block from the pool of storage area blocks. Each purposed block is allocated at a different time, which is represented by the TBW at which the purposed block is allocated. The purposed block is used to store purposed data for a data stripe until it reaches an endurance limit of 80 k PE cycles. After the purposed block reaches the endurance limit, the purposed block is retired, and a new purposed block is selected from the pool of storage area blocks to store purposed (e.g., parity) data for new data stripes.

Table 1 is provided below to help illustrate graph 300.

TABLE 1

| TBW | TLC P/E cycles | SLC parity blocks | Total Data blocks | Parity impact |
|---|---|---|---|---|
| 0% | 0 | 1 | 699 | 0.14% |
| 10% | 200 | 2 | 698 | 0.29% |
| 20% | 400 | 3 | 697 | 0.43% |
| 30% | 600 | 4 | 696 | 0.57% |
| 40% | 800 | 5 | 695 | 0.71% |
| 50% | 1000 | 6 | 694 | 0.86% |
| 60% | 1200 | 7 | 693 | 1.00% |
| 70% | 1400 | 8 | 692 | 1.14% |
| 80% | 1600 | 9 | 691 | 1.29% |
| 90% | 1800 | 10 | 690 | 1.43% |
| 100% | 2000 | | | |

At TBW 0% (e.g., time zero) a purposed block (e.g. set of parity blocks, parity block 1) is allocated from the pool of storage area blocks. The pool of storage area blocks (e.g., pool of over provisioning blocks) and the user blocks operate in TLC mode. Since the first purposed block is allocated at time zero, the purposed block has performed zero TLC PE cycles. The purposed block can be used up to the purposed block's endurance limit in SLC mode, which is 80 k PE cycles for example. In the current example, at TBW 0% one block out of 700 blocks (e.g., total blocks) of the memory component (or memory sub-system) is allocated to store purposed data, and the purposed impact is 0.14% of the total blocks. It can again be noted that the in the current example, 1 purposed block is the minimum number of purposed blocks used at any given time.

At TBW 10% after first write operations are performed (e.g. program and erase), the purposed block is determined to have satisfied a condition indicating that the purposed block is to be retired. For example, parity block 1 can be used up to the parity block's endurance limit in SLC mode, which is 80 k PE cycles for example. Responsive to determining that the purposed block has satisfied the condition indicative of the endurance state, purposed block 1 is retired and a new purposed block (e.g., parity block 2) is allocated from the pool of storage area blocks. At TBW 10%, the allocated purposed block 2 has performed 200 TLC PE cycles as part of the pool of storage area blocks. The purposed impact at TBW 10% is 0.29% of the total blocks.

Similarly, at TBW 20% after second write operations are performed, the purposed block 2 is determined to have satisfied a condition indicating that the purposed block is to be retired. For example, purposed block 2 can be used up to the purposed block's endurance limit in SLC mode, which is 80 k PE cycles for example. Responsive to determining that the purposed block has satisfied the condition indicative of the endurance state, purposed block 2 is retired and a new purposed block (e.g., purposed block 3) is allocated from the pool of storage area blocks. At TBW 20%, the allocated purposed block 2 has performed 400 TLC PE cycles are part of the pool of storage area blocks. The purposed impact at TBW 20% is 0.43% of the total blocks.

The operation can be repeated for TBW 30%-90%. At 100% TBW, 10 purposed blocks in SLC mode have been allocated to store purposed data. One purposed block in SLC mode is consumed every 10% of TBW. The last purposed block will have performed 1.8 k TLC PE cycles and 80K SLC PE cycles. The additional 1.8 k TLC PE cycles are expected to non-materially contribute (e.g. washout) over 80 k SLC PE cycle capability.

FIG. 4 is a diagram illustrating partial dynamic allocation of one or more blocks from a pool of storage area block for use as purposed blocks, in accordance with some embodiments of the disclosure. In some embodiments, the full SLC endurance can be negatively impacted if a block exceeds a particular endurance state, such as a threshold number of TLC PE cycles. Graph 400 is similar to graph 300 of FIG. 3 (e.g., TBW 0%-40%) until a threshold corresponding to the endurance state of the user blocks (or pool of storage area blocks) is determined. At TBW 50% responsive to determining that the user block of the memory component (or memory sub-system) satisfies the threshold corresponding to the endurance state of the user blocks, the purposed blocks 6-10 are allocated from the pool of storage area blocks. The number of purposed blocks that are allocated is equal to the remaining number of purposed block from the total number of purposed blocks that are used over the lifetime of the memory component (or memory sub-system).

In graph 400, line 405 represents the number of TLC PE cycles of the pool of storage area blocks and the user blocks over the TBW. The vertical lines with circles that extend from line 405 represent the allocation of a purposed block(s) from the pool of storage area blocks. Dashed line 410 represents the threshold corresponding to the endurance state of the user blocks. For example, the threshold is set at 1 k TLC PE cycles.

Table 2 is provided below to help illustrate graph 400.

TABLE 2

| TBW | TLC P/E cycles | SLC parity blocks | Total Data blocks | Parity impact |
|---|---|---|---|---|
| 0% | 0 | 1 | 699 | 0.14% |
| 10% | 200 | 2 | 698 | 0.29% |
| 20% | 400 | 3 | 697 | 0.43% |
| 30% | 600 | 4 | 696 | 0.57% |
| 40% | 800 | 5 | 695 | 0.71% |
| 50% | 1000 | 10 | 690 | 1.43% |
| 60% | 1200 | 10 | 690 | 1.43% |
| 70% | 1400 | 10 | 690 | 1.43% |
| 80% | 1600 | 10 | 690 | 1.43% |
| 90% | 1800 | 10 | 690 | 1.43% |
| 100% | 2000 | | | |

At TBW 0%-40%, purposed blocks are allocated and retired in a similar manner as described with respect to graph 300 of FIG. 3. For example, at TBW 0% a purposed block (e.g. set of purposed blocks including purposed block 1) is allocated from the pool of storage area blocks. The pool over provisioning blocks and the user blocks operate in TLC mode. The purposed block can be used up to the purposed block's endurance limit in SLC mode, which is 80 k PE cycles for example. In the current example, at TBW 0% one block out of 700 blocks of the memory component (or memory sub-system) is allocated to store purposed data, and the purposed impact is 0.14% of the total blocks. At TBW 10%, purposed block 1 is retired and a new purposed block (e.g., purposed block 2) is allocated from the pool of storage area blocks. It can again be noted that the in the current example, the minimum number of purposed blocks used at any given time are allocated and used from TBW 0%-40%.

At TBW 50%, the user blocks and the pool of storage area blocks reach a threshold corresponding to the endurance state of the user blocks. For example, the user blocks and the pool of storage area blocks have performed 1 k TLC PE cycles. At TBW 50% the remaining number of purposed blocks (e.g., 5 blocks) of the total number of purposed blocks that are used over the lifetime of the memory component (or memory sub-system) are allocated as purposed blocks (purposed blocks 6-10). Purposed blocks 6-10 are allocated from the pool of storage area blocks and used to store purposed data for data stripes. The purposed impact at TBW 0%-50% is low and minimizes the over provisioning penalty.

FIG. 5 is a diagram illustrating multi-phase dynamic allocation of one or more blocks from a pool of storage area block for use as purposed blocks, in accordance with some embodiments of the disclosure. Graph 500 is similar to graph 400 of FIG. 4 from TBW 50%-100%. At TBW 0% (e.g., time zero), a number of purposed blocks from the pool of storage area blocks that is greater than the minimum number of purposed blocks that can store purposed data for a maximum number of open user blocks at any given time and less than the total number of purposed blocks that are to be used over the lifetime of the memory component are allocated. For example, the minimum number of purposed blocks used to store purposed data until the user blocks satisfy the threshold corresponding to the endurance state of the user blocks are allocated at TBW 0%. At TBW 50% responsive to satisfying the threshold corresponding to the endurance state of the user blocks, the remaining number of purposed blocks of a total number of purposed blocks that are used over a lifetime of the memory component to a second set of purposed block are allocated. For example, after the TLC PE cycle threshold is reached, the remaining purposed blocks used to store purposed data to TBW 100% are allocated.

In graph 500, line 505 represents the number of TLC PE cycles of the pool of storage area blocks and the user blocks over the TBW. The vertical lines with circles that extend from line 505 represent the allocation of a purposed blocks from the pool of storage area blocks. Dashed line 510 represents the threshold corresponding to the endurance state of the user blocks. For example, the threshold is set at 1 k TLC PE cycles.

Table 3 is provided below to help illustrate graph 500.

TABLE 3

| TBW | TLC PIE cycles | SLC parity blocks | Total Data blocks | Parity impact |
|---|---|---|---|---|
| 0% | 0 | 5 | 695 | 0.71% |
| 10% | 200 | 5 | 695 | 0.71% |
| 20% | 400 | 5 | 695 | 0.71% |
| 30% | 600 | 5 | 695 | 0.71% |
| 40% | 800 | 5 | 695 | 0.71% |
| 50% | 1000 | 10 | 690 | 1.43% |
| 60% | 1200 | 10 | 690 | 1.43% |
| 70% | 1400 | 10 | 690 | 1.43% |
| 80% | 1600 | 10 | 690 | 1.43% |
| 90% | 1800 | 10 | 690 | 1.43% |
| 100% | 2000 | | | |

At TBW 0%, the minimum number of purposed blocks used to store purposed data until the user blocks satisfy the threshold corresponding to the endurance state of the user blocks are allocated. In the current example, purposed blocks 1-5 are allocated to store parity data for data stripes at TBW 0%. A number of write operations are performed from TBW 0% to TBW 50%, which use purposed blocks 1-5 to store parity data. At TBW 50%, purposed blocks 1-5 are retired.

It can be noted that in FIG. 5, the blocks allocated at TBW 0% won't hit 80K until 50% TBW. In some embodiments, the memory component (e.g., NAND) can weakened as more P/E cycles are added and the memory component characteristics can degrade with P/E cycles although the characteristics are within the specified limits. By doing a batch allocation as illustrated in FIG. 5, the P/E cycle accumulation rate on SLC blocks is slowed. This helps the early TBW (ex: <30% TBW) to experience P/E cycles less than 50K P/E cycles and exhibit a good behavior. A trade-off is made between the P/E cycle accumulation rate Vs OP penalty (more blocks have lesser P/E cycle accumulation which have more OP penalty).

At TBW 50%, the user blocks and the pool of storage area blocks reach a threshold corresponding to the endurance state of the user blocks. For example, at TBW 50% the user blocks and the pool of storage area blocks have performed 1 k TLC PE cycles, which satisfies the threshold corresponding to the endurance state of the user blocks. At TBW 50% the remaining number of purposed blocks (e.g., 5 blocks) of the total number of purposed blocks that are used over the lifetime of the memory component (or memory sub-system) are allocated as purposed blocks (purposed blocks 6-10). Purposed blocks 6-10 are allocated from the pool of storage area blocks and used to store purposed (e.g., parity) data for data stripes. The purposed impact at TBW 0%-50% is low and minimizes the over provisioning penalty.

Figure 6:
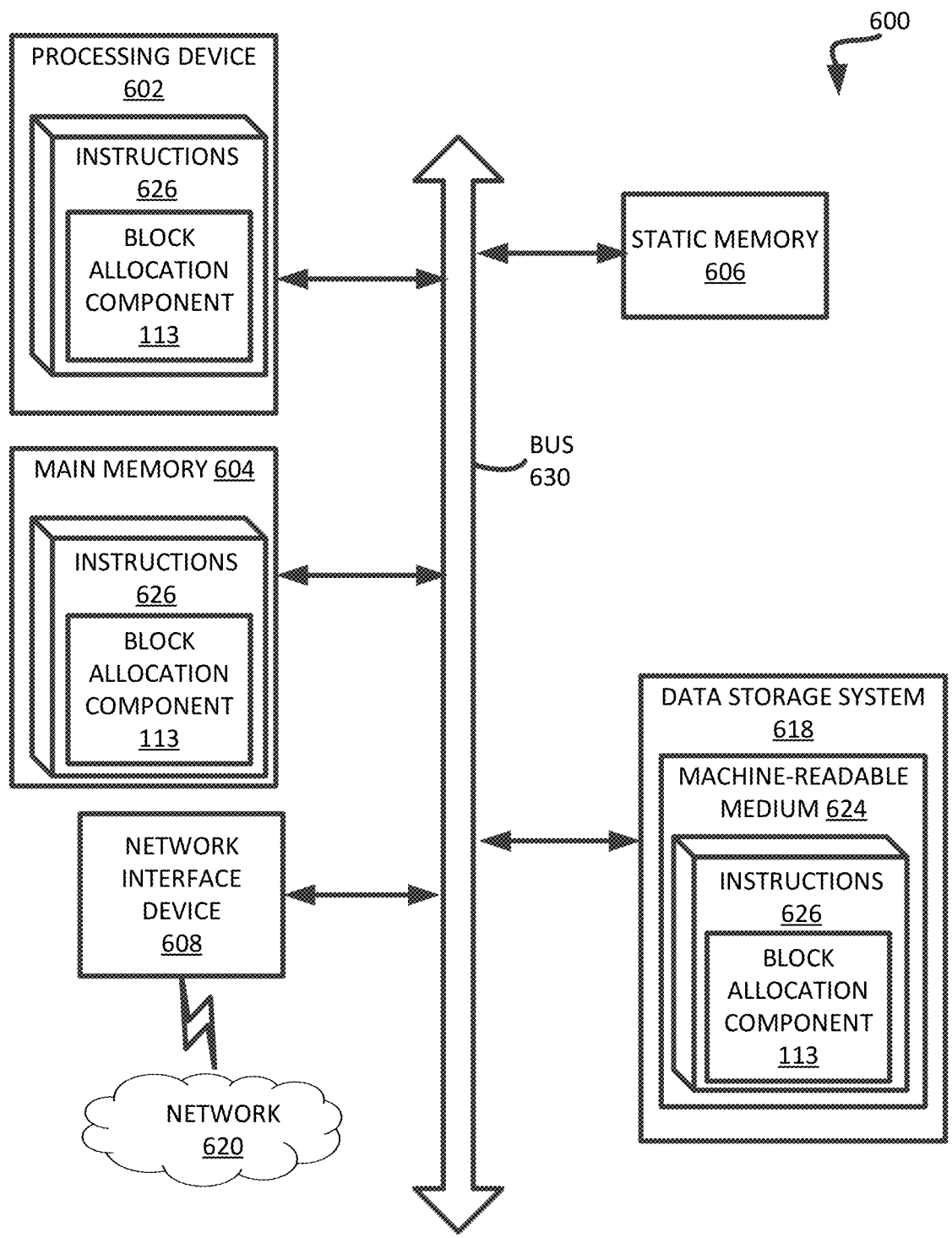
FIG. 6 illustrates an example machine of a computer system within which a set of instructions, for causing the machine to perform any one or more of the operations discussed herein, can be executed.

FIG. 6 illustrates an example machine of a computer system 600 within which a set of instructions, for causing the machine to perform any one or more of the methodologies discussed herein, can be executed. In some embodiments, the computer system 600 can correspond to a host system (e.g., the host system 120 of FIG. 1A) that includes, is coupled to, or utilizes a memory sub-system (e.g., the memory sub-system 110 of FIG. 1A) or can be used to perform the operations of a controller (e.g., to execute an operating system to perform operations corresponding to the block allocation component 113 of FIG. 1A). In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 600 includes a processing device 602, a main memory 604 (e.g., read-only memory (ROM), flash memory, dynamic random access memory (DRAM) such as synchronous DRAM (SDRAM) or Rambus DRAM (RDRAM), etc.), a static memory 606 (e.g., flash memory, static random access memory (SRAM), etc.), and a data storage system 618, which communicate with each other via a bus 630.

Processing device 602 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 602 can also be one or more special-purpose processing devices such as an application specific integrated circuit (ASIC), a field programmable gate array (FPGA), a digital signal processor (DSP), network processor, or the like. The processing device 602 is configured to execute instructions 626 for performing the operations and steps discussed herein. The computer system 600 can further include a network interface device 608 to communicate over the network 620.

The data storage system 618 can include a machine-readable storage medium 624 (also known as a non-transitory computer-readable storage medium) on which is stored one or more sets of instructions 626 or software embodying any one or more of the methodologies or functions described herein. The instructions 626 can also reside, completely or at least partially, within the main memory 604 and/or within the processing device 602 during execution thereof by the computer system 600, the main memory 604 and the processing device 602 also constituting machine-readable storage media. The machine-readable storage medium 624, data storage system 618, and/or main memory 604 can correspond to the memory sub-system 110 of FIG. 1A.

In one embodiment, the instructions 626 include instructions to implement functionality corresponding to the block allocation component 113 of FIG. 1A. While the machine-readable storage medium 624 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the disclosure. The term "machine-readable storage medium" shall accordingly be taken to include, but not be limited to, solid-state memories, optical media, and magnetic media.

Some portions of the preceding detailed descriptions have been presented in terms of operations and symbolic representations of operations on data bits within a computer memory. These algorithmic descriptions and representations are the ways used by those skilled in the data processing arts to most effectively convey the substance of their work to others skilled in the art. An algorithm or operation is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms, operations, and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the disclosure is not described with reference to any particular programming language. It will be appreciated that a variety of programming languages can be used to implement the teachings of the disclosure as described herein.

The disclosure can be provided as a computer program product, or software, that can include a machine-readable medium having stored thereon instructions, which can be used to program a computer system (or other electronic devices) to perform a process according to the disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or." That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims may generally be construed to mean "one or more" unless specified otherwise or clear from context to be directed to a singular form. Moreover, use of the term "an implementation" or "one implementation" or "an embodiment" or "one embodiment" or the like throughout is not intended to mean the same implementation or implementation unless described as such. One or more implementations or embodiments described herein may be combined in a particular implementation or embodiment. The terms "first," "second," "third," "fourth," etc. as used herein are meant as labels to distinguish among different elements and may not necessarily have an ordinal meaning according to their numerical designation.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A system comprising:
   a memory component; and
   a processing device, operatively coupled with the memory component, to:
      allocate one or more blocks from a pool of storage area blocks of the memory component to a first set of purposed blocks;
      perform a first plurality of write operations to write first data to a first plurality of data stripes at user blocks of the memory component, wherein the first set of purposed blocks to store purposed data of the first plurality of data stripes associated with the first plurality of write operations;
      determine whether the blocks in the first set of purposed blocks satisfy a condition indicating that the first set of purposed blocks are to be retired;
      responsive to the blocks in the first set of purposed blocks satisfying the condition, determine that the blocks in the first set of purposed blocks are to be retired, and allocate one or more other blocks from the pool of storage area blocks of the memory component to a second set of purposed blocks; and
      perform a second plurality of write operations to write second data to a second plurality of data stripes at the user blocks of the memory component, the second set of purposed blocks to store purposed data of the second plurality of data stripes associated with the second plurality of write operations.

2. The system of claim 1, wherein to perform the first plurality of write operations to write the first data to the first plurality of data stripes at the user blocks of the memory component, the processing device is to:
   perform a first write operation of the first plurality of write operations to write a first portion of the first data to a data stripe of the first plurality of data stripes at the user blocks of the memory component, wherein parity data of the data stripe of the first plurality of data stripes is stored at the first set of purposed blocks;
   validate that the data stripe of the first plurality of data stripes that has been written at the user blocks of the memory component is absent of uncorrectable bit errors;
   responsive to validating that the data stripe of the first plurality of data stripes that has been written at the user blocks of the memory component is absent of the uncorrectable bit errors, perform an erase operation to erase the first set of purposed blocks; and
   perform a second write operation of the first plurality of write operations to write a second portion of the first data to an other data stripe of the first plurality of data stripes at the user blocks of the memory component, wherein parity data of the other data stripe is stored at the first set of purposed blocks subsequent to performing the erase operation at the first set of purposed blocks.

3. The system of claim 1, wherein the user blocks of the memory component at which the first plurality of data stripes and the second plurality of data stripes are written operate in a multi-bit mode, and wherein the blocks in the first set of purposed blocks and the other blocks in the second set of purposed blocks operate in a single-bit mode or a multi-bit mode.

4. The system of claim 3, wherein over provisioning blocks in the pool of storage area blocks operate in the multi-bit mode or the single-bit mode.

5. The system of claim 1, wherein to determine whether the blocks in the first set of purposed blocks satisfy the condition, the processing device is to:
   determine a raw bit error rate (RBER) associated with the first set of purposed blocks;
   determine whether the RBER associated with the first set of purposed blocks satisfies a threshold; and
   responsive to the RBER associated with the first set of purposed blocks satisfying the threshold, retire the first set of purposed blocks.

6. The system of claim 1, wherein the first plurality of write operations to write the first data to the first plurality of data stripes at the user blocks of the memory component and the second plurality of write operations to write the second data to the second plurality of data stripes at the user blocks of the memory component are redundant array of independent NAND (RAIN) operations to write a plurality of RAIN stripes.

7. The system of claim 1, wherein the first set of purposed blocks comprise a minimum number of purposed blocks that can store purposed data for a maximum number of open user blocks at any given time, wherein the first set of purposed blocks comprise fewer purposed blocks than a total number of purposed blocks used over a lifetime of the memory component.

8. A system comprising:
   a memory component; and
   a processing device, operatively coupled with the memory component, to:
   allocate one or more blocks from a pool of over provisioning blocks of the memory component to a first set of parity blocks;
   perform a first plurality of write operations to write first data to a first plurality of data stripes at user blocks of the memory component, wherein the first set of parity blocks to store parity data of the first plurality of data stripes associated with the first plurality of write operations;
   determine whether the user blocks of the memory component satisfy a threshold corresponding to an endurance state of the user blocks;
   responsive to determining that the user blocks of the memory component satisfy the threshold corresponding to the endurance state of the user blocks, allocate blocks from the pool of over provisioning blocks at least equal to a remaining number of parity blocks of a total number of parity blocks that are used over a lifetime of the memory component to a second set of parity blocks; and
   perform a second plurality of write operations to write second data to a second plurality of data stripes at the user blocks of the memory component, the second set of parity blocks to store parity data of the second plurality of data stripes associated with the second plurality of write operations.

9. The system of claim 8, wherein to allocate the one or more blocks from the pool of over provisioning blocks of the memory component to the first set of parity blocks, the processing device is to:
   allocate a number of blocks from the pool of over provisioning blocks that equal a minimum number of parity blocks that can store parity data for a maximum number of open user blocks at any given time.

10. The system of claim 9, the processing device further is to:
    determine whether the first set of parity blocks satisfy a condition indicating that the first set of parity blocks are to be retired;
    responsive to determining that the first set of parity blocks satisfy the condition, indicate that the blocks in the first set of parity blocks are to be retired and allocate one or more blocks from the pool of over provisioning blocks of the memory component to a third set of parity blocks; and
    perform a third plurality of write operations to write third data to a third plurality of data stripes at the user blocks of the memory component, wherein the third set of parity blocks to store parity data of the third plurality of data stripes associated with the third plurality of write operations.

11. The system of claim 10, wherein to determine whether the first set of parity blocks satisfy the condition indicating that the first set of parity blocks are to be retired, the processing device is to:
    determine a raw bit error rate (RBER) associated with the first set of parity blocks;
    determine whether the RBER associated with the first set of parity blocks satisfies a threshold; and
    responsive to the RBER associated with the first set of parity blocks satisfying the threshold, retire the first set of parity blocks.

12. The system of claim 8, wherein to allocate the one or more blocks from the pool of over provisioning blocks of the memory component to the first set of parity blocks, the processing device is to:
    allocate a number of blocks from the pool of over provisioning blocks that is greater than a minimum number of parity blocks that can store parity data for a maximum number of open user blocks at any given time, and less than the total number of parity blocks that are to be used over the lifetime of the memory component.

13. The system of claim 8, wherein to perform the first plurality of write operations to write the first data to the first plurality of data stripes at the memory component, the processing device is to:
    perform a first write operation of the first plurality of write operations to write a first portion of the first data to a data stripe of the first plurality of data stripes at the user blocks of the memory component, wherein parity data of the data stripe of the first plurality of data stripes is stored at the first set of parity blocks;
    validate that the data stripe of the first plurality of data stripes that has been written at the user blocks of the memory component is absent of uncorrectable bit errors;
    responsive to validating that the data stripe of the first plurality of data stripes that has been written at the user blocks of the memory component is absent of the uncorrectable bit errors, perform an erase operation to erase the first set of parity blocks; and
    perform a second write operation of the first plurality of write operations to write a second portion of the first data to an other data stripe of the first plurality of data stripes at the user blocks of the memory component, wherein parity data of the other data stripe is stored at the first set of parity blocks subsequent to performing the erase operation at the first set of parity blocks.

14. The system of claim 8, wherein the user blocks of the memory component at which the first data of the first plurality of data stripes and the second data of the second plurality of data stripes are written operate in a multi-bit mode, wherein the blocks of the first set of parity blocks and the blocks of the second set of parity blocks operate in a single-bit mode, and wherein the pool of over provisioning blocks operate in the multi-bit mode.

15. The system of claim 8, wherein the first plurality of write operations to write the first data to the first plurality of data stripes at the user blocks of the memory component and the second plurality of write operations to write the second data to the second plurality of data stripes at the user blocks of the memory component are redundant array of independent NAND (RAIN) operations to write a plurality of RAIN stripes.

16. The system of claim 8, wherein the first set of parity blocks comprise fewer parity blocks than the total number of parity blocks that are used over the lifetime of the memory component.

17. A method comprising:
allocating, by a processing device, one or more blocks from a pool of storage area blocks of a memory component to a first set of purposed blocks;
performing a first plurality of write operations to write first data to a first plurality of data stripes at user blocks of the memory component, wherein the first set of purposed blocks to store purposed data of the first plurality of data stripes associated with the first plurality of write operations;
determining whether the blocks in the first set of purposed blocks satisfy a condition indicating that the first set of purposed blocks are to be retired;
responsive to the blocks in the first set of purposed blocks satisfying the condition, determining that the blocks in the first set of purposed blocks are to be retired, and allocating one or more other blocks from the pool of storage area blocks of the memory component to a second set of purposed blocks; and
performing a second plurality of write operations to write second data to a second plurality of data stripes at the user blocks of the memory component, the second set of purposed blocks to store purposed data of the second plurality of data stripes associated with the second plurality of write operations.

18. The method of claim 17, wherein performing the first plurality of write operations to write the first data to the first plurality of data stripes at the user blocks of the memory component, comprises:
performing a first write operation of the first plurality of write operations to write a first portion of the first data to a data stripe of the first plurality of data stripes at the user blocks of the memory component, wherein parity data of the data stripe of the first plurality of data stripes is stored at the first set of purposed blocks;
validating that the data stripe of the first plurality of data stripes that has been written at the user blocks of the memory component is absent of uncorrectable bit errors;
responsive to validating that the data stripe of the first plurality of data stripes that has been written at the user blocks of the memory component is absent of the uncorrectable bit errors, performing an erase operation to erase the first set of purposed blocks; and
performing a second write operation of the first plurality of write operations to write a second portion of the first data to an other data stripe of the first plurality of data stripes at the user blocks of the memory component, wherein parity data of the other data stripe is stored at the first set of purposed blocks subsequent to performing the erase operation at the first set of purposed blocks.

19. The method of claim 17, wherein the user blocks of the memory component at which the first plurality of data stripes and the second plurality of data stripes are written operate in a multi-bit mode, and wherein the blocks in the first set of purposed blocks and the other blocks in the second set of purposed blocks operate in a single-bit mode or multi-bit mode, and wherein over provisioning blocks in the pool of storage area blocks operate in the multi-bit mode or single-bit mode.

20. The method of claim 17, wherein determining whether the blocks in the first set of purposed blocks satisfy the condition, comprises:
determining a raw bit error rate (RBER) associated with the first set of purposed blocks;
determining whether the RBER associated with the first set of purposed blocks satisfies a threshold; and
responsive to the RBER associated with the first set of purposed blocks satisfying the threshold, retiring the first set of purposed blocks.

* * * * *